(12) United States Patent
Yeh et al.

(10) Patent No.: US 12,416,508 B2
(45) Date of Patent: Sep. 16, 2025

(54) INTERACTIVE WAY-FINDER

(71) Applicant: Universal City Studios LLC, Universal City, CA (US)

(72) Inventors: Wei C. Yeh, Orlando, FL (US); Rachel E. Rodgers, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 184 days.

(21) Appl. No.: 17/821,226

(22) Filed: Aug. 22, 2022

(65) Prior Publication Data

US 2024/0060792 A1 Feb. 22, 2024

(51) Int. Cl.
*G01C 21/36* (2006.01)
*G06F 3/14* (2006.01)

(52) U.S. Cl.
CPC ..... *G01C 21/3632* (2013.01); *G01C 21/3644* (2013.01); *G06F 3/14* (2013.01)

(58) Field of Classification Search
CPC .......... G01C 21/3632; G01C 21/3644; G01C 21/26; G01C 21/265; G01C 21/3811; G06F 3/014
See application file for complete search history.

(56) References Cited

U.S. PATENT DOCUMENTS

| | | | |
|---|---|---|---|
| 7,496,445 B2 | 2/2009 | Mohsini et al. | |
| 9,074,898 B2 | 7/2015 | Ozawa et al. | |
| 9,538,332 B1 * | 1/2017 | Mendelson | H04W 48/10 |
| 10,152,840 B2 * | 12/2018 | Geraghty | G06K 7/10297 |
| 10,299,189 B2 | 5/2019 | Scarborough et al. | |
| 10,478,719 B2 | 11/2019 | Weston et al. | |
| 2001/0032880 A1 * | 10/2001 | Levine | G08G 1/096844 |
| | | | 235/384 |
| 2006/0203617 A1 * | 9/2006 | Matthey | G04G 21/02 |
| | | | 368/11 |
| 2007/0060358 A1 | 3/2007 | Amaitis et al. | |
| 2007/0290837 A1 * | 12/2007 | Sarin | G01C 21/20 |
| | | | 340/995.19 |

(Continued)

OTHER PUBLICATIONS

Skyflyer, Title: "How to use the Course Indicator in the Patagonia Bush Trip", publisher: flight simulator forum, published: Aug. 2020, p. 1. (Year: 2020).*

(Continued)

*Primary Examiner* — Wilson W Tsui
(74) *Attorney, Agent, or Firm* — Fletcher Yoder, P.C.

(57) ABSTRACT

An interactive way-finder system includes an interactive way-finder device having device communications circuitry and a display that displays one or more hands pointing in the direction of a destination based on proximity information received from communications circuitry of a destination. The destination is represented on the display as a displayed destination and may be an attraction, a restaurant, an amusement park exit, restrooms, or the like. The destination may be selected based on user input, on location of the interactive way-finder system in the amusement park, or based on a user profile. The communication between the interactive way-finder device and the destination may enable special effects at the destination, onboard effects on the interactive way-finder device, or both. The interactive way-finder device may be capable of operating in several different modes.

20 Claims, 9 Drawing Sheets

(56) References Cited

U.S. PATENT DOCUMENTS

| | | | |
|---|---|---|---|
| 2008/0123322 A1* | 5/2008 | Tane | G09G 3/3611 |
| | | | 349/1 |
| 2008/0198012 A1* | 8/2008 | Kamen | G16H 20/60 |
| | | | 340/572.1 |
| 2011/0213514 A1* | 9/2011 | Baxter | G01C 23/00 |
| | | | 701/14 |
| 2016/0327915 A1* | 11/2016 | Katzer | G04C 3/002 |
| 2017/0007882 A1 | 1/2017 | Wener | |
| 2017/0138742 A1 | 5/2017 | Techer | |
| 2018/0240151 A1 | 8/2018 | D'Andrea et al. | |
| 2020/0408556 A1* | 12/2020 | Shantharam | G04G 21/04 |

OTHER PUBLICATIONS

PCT/US2023/030723 International Search Report and Written Opinion mailed Feb. 15, 2024.

* cited by examiner

INTERACTIVE WAY-FINDER

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks or similar entertainment facilities may have a multitude of attractions that are spread out over a large geographical area. Guests in amusement parks or similar entertainment facilities may need assistance in locating various attractions (e.g., rides and interactive features). However, guests may not know or be able to easily discern the locations of each of these attractions.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, an interactive way-finder system is disclosed. The interactive way-finder system includes a destination that has an emitter and an interactive way-finder device. The interactive way-finder device includes a housing, a display coupled to the housing that includes a hand, and device communications circuitry disposed within the housing. The device communications circuitry is configured to receive proximity information from the emitter. The interactive way-finder device also includes a controller configured to control the display to change a characteristic of the hand based on the proximity information.

In another embodiment, an interactive way-finder device is disclosed. The interactive way-finder device includes a housing, a display coupled to the housing that includes a hand, memory disposed in the housing, an inertial measurement unit sensor disposed in the housing, and device communications circuitry disposed in the housing. The device communications circuitry is configured to receive proximity information from a plurality of emitters in a wireless network and store the proximity information in the memory. The interactive way-finder device also includes a controller configured to change a position of the hand based on inertial data from the inertial measurement unit sensor, control the display based at least in part on the proximity information, and cause the display to present a displayed destination.

In another embodiment, a method of way finding with an interactive way-finder device is disclosed. The method includes receiving a first signal comprising first proximity information for an attraction via wireless communications circuitry, providing instructions to cause a display of an interactive way-finder device to display information related to the attraction based on the first proximity information, receiving a second signal comprising second proximity information for the attraction via the wireless communications circuitry, and providing updated instructions to cause the display of the interactive way-finder device to display updated information related to the attraction based on the second proximity information.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
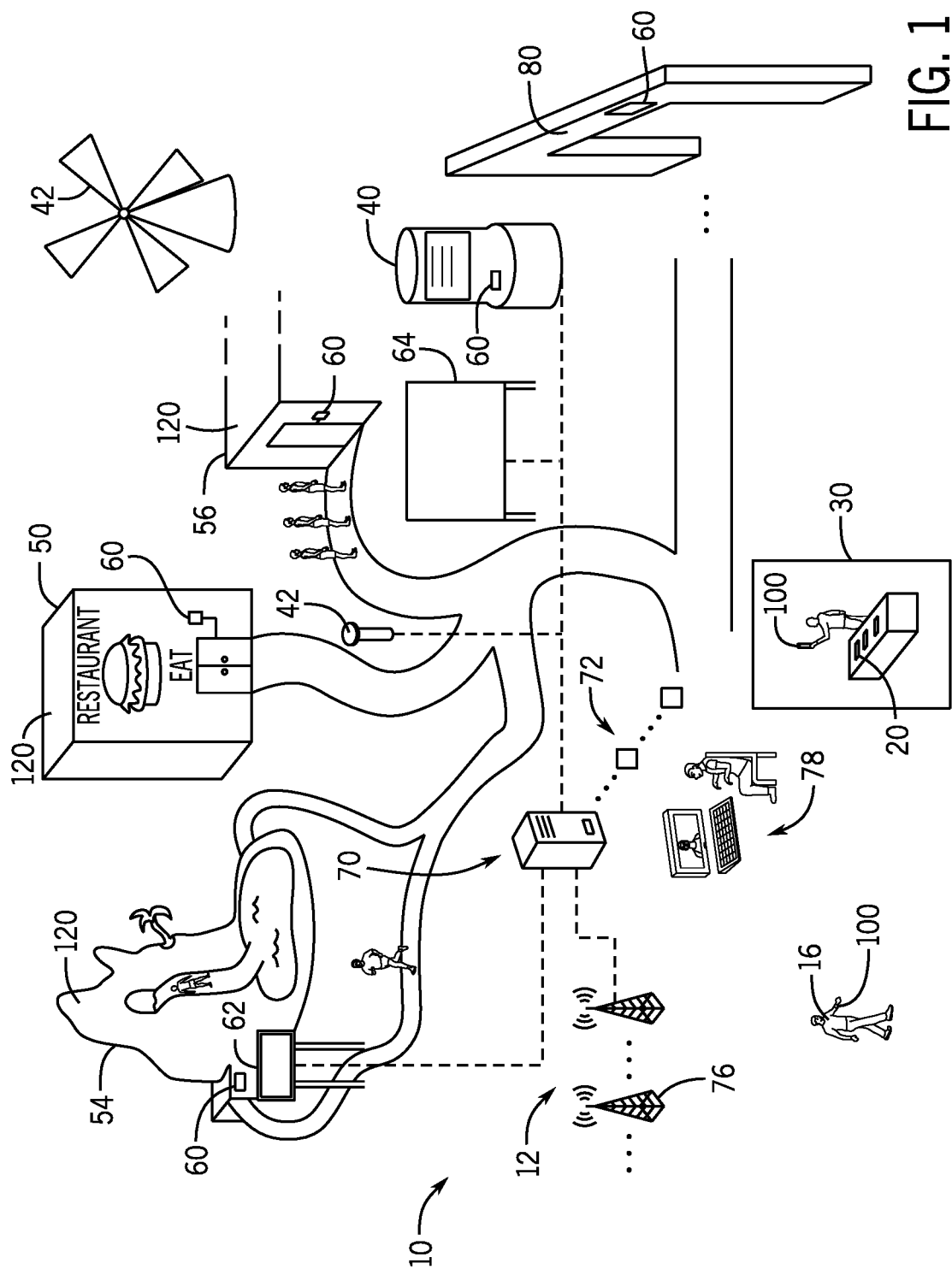
FIG. 1 is a schematic view of an amusement park including attractions and an interactive way-finder system, in accordance with present embodiments.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Further, to the extent that certain terms such as parallel, perpendicular, and so forth are used herein, it should be understood that these terms allow for certain deviations from a strict mathematical definition, for example to allow for deviations associated with manufacturing imperfections and associated tolerances.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

It is now recognized that amusement park guests or guests of similar facilities (e.g., malls, concert venues, and campuses) may benefit from interactive devices that provide geographical guidance and interactive experiences. In the present disclosure, reference is frequently made to use of present embodiments in an amusement park; however, it should be understood that an amusement park is only one example of many different venues in which present embodiments may be employed. Indeed, it is now recognized that guests of various venues may desire or even require assistance navigating to points of interest. Further, it is now recognized that such guests may seek opportunities for interactive experiences within the venues. Accordingly, present embodiments are directed to an interactive way-finder device and system that, in addition to providing navigational guidance, interacts with attractions when within a certain distance, causing a reaction on the interactive way-finder device, a reaction on the attraction, or both. As an example, an interactive way-finder device in accordance with the present disclosure may direct guests to various attractions, including the nearest interactive feature, in an amusement park and provide interactive options or experiences directly from the interactive way-finder device along the way.

FIG. 1 is a schematic illustration of an amusement park 10 that incorporates an interactive way-finder system 12. The system 12 may include interactive way-finder devices 100 associated with guests 16. An interactive way-finder device 100 may operate in different modes to assist a guest 16 with finding destinations 120. The types of destinations 120 may depend on the mode of the interactive way-finder device 100. For example, in one mode, the destination 120 may be the nearest ride 54 or a premier ride associated with the region of the amusement park 10 in which the guest 16 is located. In another mode, the destination 120 may be the nearest interactive feature 40, for example a gesture interactive station such as a puppet station 40, or an interactive feature 42 that interacts with the interactive way-finder device 100 itself. The interactive features 40, 42 may be configured to only interact with guests that have an interactive way-finder device 100, which may provide an incentive for a guest to purchase an interactive way-finder device 100. In yet another mode, the destination 120 may be the park exit 80, the nearest restaurant 50, or the nearest restroom facilities 56. In a "gaming" mode, the destination 120 may be associated with a treasure hunt or other type of game.

Figure 2:
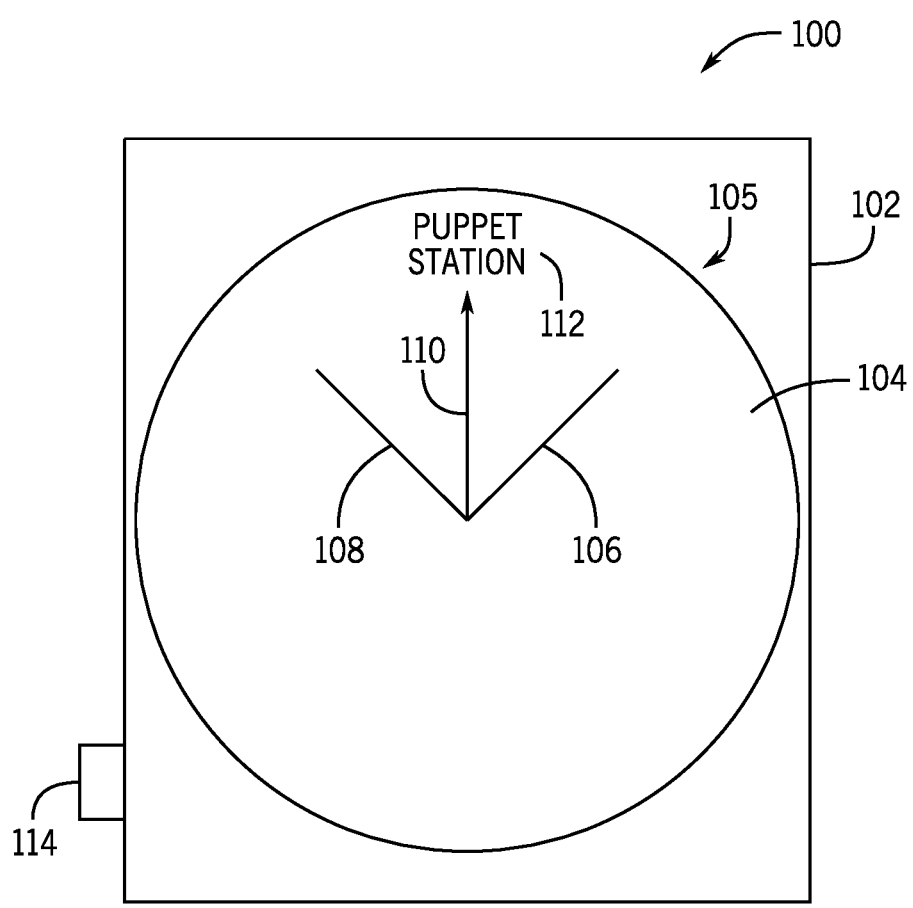
FIG. 2 is a schematic illustration of an interactive way-finder device of an interactive way-finder system, in accordance with present embodiments.

The mode of the interactive way-finder device 100 may be selected by the guest 16 using a mode switch 114 (as shown in FIG. 2), or may be automatically selected based on the guest's location in the amusement park 10 or based on a user profile, or may be selected based on a combination of automatically detected information and guest input (e.g., via the mode switch 114).

The interactive way-finder device 100 may communicate wirelessly with sensors 60 at various destinations 120 in the amusement park 10 to determine the relative distance from the interactive way-finder device 100 to the destination 120 and update a display 105 (as shown in FIG. 2) on the interactive way-finder device 100 accordingly. In an embodiment, the sensors 60 are associated with various destinations 120 as described above, which could include entrance gates for areas of the amusement park 10, attraction entrances, interactive features 40, 42, multiplayer game sites 64, the park exit 80, a restaurant 50, or restroom facilities 56. Further, the interactive way-finder device 100 may activate a reaction in an interactive feature or other attraction (e.g., spinning of clock hands, spinning of windmill arms, water sprays, bubbles, confetti) at various locations in the amusement park 10. Such interactions and activations may be based on one or more of detection of the interactive way-finder device 100 within a threshold distance of the attraction, input provided via the interactive way-finder device 100, actions performed on an interface of an interactive feature via the interactive way-finder device 100 or in its presence, detected movement (e.g., gestures) of an individual holding the interactive way-finder device 100, and/or the like. In one example, the presence of the interactive way-finder device 100 within a proximity to a destination 120, such as an interactive feature 42, activates a local special effect, e.g., based on the proximity of the interactive way-finder device 100 wirelessly communicated to the sensor 60. In another embodiment, the proximity of the interactive way-finder device 100 to an interactive feature 40 may activate onboard effects of the interactive way-finder device 100, such as a change in the appearance of the display of the interactive way-finder device 100, or a haptic effect, such as a vibration. In another embodiment, the proximity of the interactive way-finder device 100 to an interactive feature 40 may activate a response in the interactive feature 40, and/or activate a local special effect, and/or activate onboard effects of the interactive way-finder device 100.

The interactive way-finder system 12 may include a central controller 70, which may be implemented as a distributed server or computer system 72. The central controller 70 may communicate with the interactive way-finder devices 100 and/or the sensors 60 via a network, such a wireless network 76, and may permit operator input via an operator interface 78. Thus, the central controller 70 may monitor operation of the interactive way-finder devices 100 throughout an area, which may facilitate data tracking and system maintenance. For example, the central controller 70 may be configured to identify malfunctions in the interactive way-finder devices 100, the sensors 60, the interactive features 42, and so forth.

FIG. 2 is a schematic illustration of an embodiment of an interactive way-finder device 100. In the illustrated embodiment, the interactive way-finder device 100 includes a housing 102, a display 105 including a face 104, hands 106, 108, 110. In the illustrated embodiment, the interactive way-finder device 100 also includes a mode switch 114. The hands 106, 108, 110 are designed to move in a radial direction, where the ends of the hands farthest away from the center of the face 104 move in a manner similar to that of hands on a clock (but not necessarily in a single direction in correlation with time). While the housing 102 is illustrated as a rectangle, the housing 102 may take any shape. In an embodiment, the display 105, including the face 104, is coupled to the housing 102, and may be a physical display, for example, as on a clock or a compass. In another embodiment, the display 105, including the face 104, is coupled to the housing 102, and may be an electronic display, such as an LCD (liquid crystal display), OLED (organic light-emitting diodes) display, or other electronic display. In an embodiment, the hands 106, 108, and 110 may be physical objects, for example, physical hands as on a clock or a compass. In another embodiment, the hands 106, 108, and 110 may be electronic hands, such as an LCD display, OLED display, or other electronic display. The display 105 may include a face 104 that also may include one or more displayed destinations 112. The displayed destination 112 is representative of the destination 120 and may be entrance gates for areas of the amusement park 10, attraction entrances, interactive features 40, 42, multiplayer game sites 64, the park exit 80, a restaurant 50, restroom facilities 56, or other destination. In an embodiment, the displayed destination 112 may change depending on the mode of operation of the interactive way-finder device 100, as described in more detail below.

Figure 3:
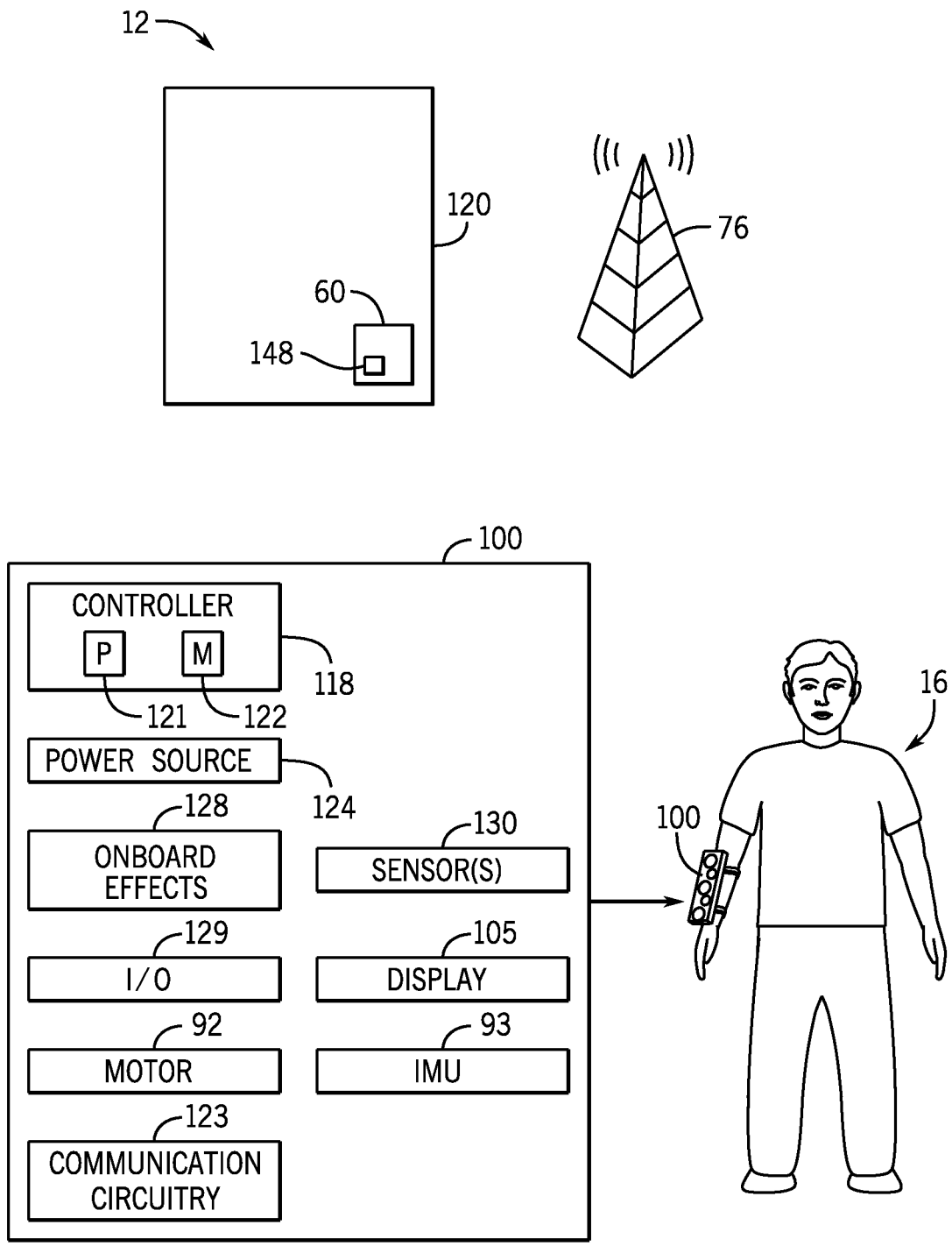
FIG. 3 is a block diagram of an interactive way-finder device within an interactive way-finder system, in accordance with present embodiments.

FIG. 3 is a block diagram of one embodiment of the interactive way-finder system 12 including the interactive way-finder device 100 and a destination 120 having a sensor 60. Once engaged, the interactive way-finder device 100 may activate certain functions, as described in more detail below, under control of a processor 121 of a controller 118 and stored in a memory 122.

The processor 121 may include one or more processing devices, and the memory 122 may include one or more tangible, non-transitory, machine-readable media. By way of example, such machine-readable media can include RAM, ROM, EPROM, EEPROM, magnetic storage devices, or any other medium which can be used to carry or store desired program code in the form of machine-executable instructions or data structures and which can be accessed by the processor or by other processor-based devices.

The interactive way-finder device 100 may also include an inertial measurement unit (IMU) sensor 93. The IMU sensor may include gyroscopes to measure and report angular rate, accelerometers to measure and report specific force and/or magnetometers to measure the magnetic field surrounding the interactive way-finder device 100. In an embodiment, a signal from the IMU sensor 93 drives an orientation of the display 105. A signal from an accelerometer of the IMU sensor 93 may be used to identify the correct orientation for the display 105 depending on how the interactive way-finder device 100 is being held. In addition, the signal from the IMU sensor 93 may allow the hand 110 (shown in FIG. 2) to point to "magnetic north" and also provide input to adjust the positions of the hands 106 and 108 (shown in FIG. 2) when the interactive way-finder device 100 is in "hot-and-cold" mode as described below, based on the direction of travel as determined by the IMU sensor 93. "Magnetic north" means the direction in which the north end of a compass needle or other freely suspended magnet will point in response to the earth's magnetic field.

The interactive way-finder device 100 may also include one or more sensors 130, such as a pressure sensor or an ambient light sensor (as input to adjust display brightness). These sensors 130 may be utilized separately or in conjunction with the IMU sensor 93 to facilitate certain operations. For example, changes in pressure or lighting may be used separately or in conjunction with location sensing to identify where the interactive way-finder device 100 is located. For example, changes in pressure and/or lighting may indicate or confirm that the interactive way-finder device 100 has moved into a climate-controlled building and/or that the interactive way-finder device 100 is proximate an interactive feature 40, 42 with a certain type of lighting.

The interactive way-finder device 100 may have different levels of power supplied from a power source 124 that may correspond to different power modes: standby mode, active mode, and OFF. For example, the power source 124 may supply low power to the interactive way-finder device 100 while in standby mode. While in standby mode, for example, the power source 124 may supply enough power to the interactive way-finder device so that the IMU sensor 93 may detect motion of the interactive way-finder device 100, but not enough power to fully activate the display 105, face 104, and other features. Movement of the interactive way-finder device 100 as detected by the IMU sensor 93 may switch the power source 124 from standby mode (low power) to active mode (full power), where the display 105 (including but not limited to the hands 106, 108, and 110), the face 104 (which may be an e-ink or other low power display, or may be an OLED display), and other features described herein are activated. In addition, low power and/or high power may be activated from the power source 124 of the interactive way-finder device 100 by a power switch being turned to "standby/ON" and/or "active/ON" (not pictured). The power may be switched from active mode to standby mode after a specific time period has elapsed during which the interactive way-finder device 100 has not been moved, as determined by the IMU sensor 93. The power may be deactivated from the power source 124 of the interactive way-finder device 100, for example, by a power switch being turned to "OFF" (not pictured).

In certain embodiments, the interactive way-finder device 100 may also include additional onboard features, such as the motor 92. The motor 92 may be powered by the power source 124. The motor 92 may be used to adjust the position of the hands 106, 108, 110 in an embodiment where the hands 106, 108, and 110 are mechanical (not graphics or elements of a displayed image). The motor 92 may alternatively or additionally be used in relation to onboard effects 128, as described below. The motor 92 may be an induction motor, a stepper motor, or the like.

The interactive way-finder device 100, in an embodiment, may also include onboard effects 128, such as one or more light emitting diodes (LEDs), one or more haptic functions (for example a vibration function, a force function, or the like), a sound, a change in the display 105 such as a change in the colors of the display 105, spinning hands 106, 108, 110, or other onboard effects, that are activated in conjunction with interactive events, as described in more detail below. These onboard effects 128 may also be powered by the motor 92 or more generally by the power source 124. The interactive way-finder device 100 may include other input/output devices 129 for user inputs, such as additional buttons, soft keys, notification devices, audio input/output devices, etc.

The interactive way-finder device 100 includes device communications circuitry 123, such as transceivers, antennas, transmitters, receivers, radio transceiver circuits, and signal processing hardware and/or software (e.g., hardware or software filters, analog/digital converters, multiplexers amplifiers), or a combination thereof, that may be powered by the power source 124 and configured to communicate over wireless communication paths via Infrared wireless communication, radio frequency transmission, Bluetooth, Wi-Fi, near-field communication (NFC), ultra wideband (UWB), etc.

In some embodiments, the interactive way-finder device 100 may form a communication connection with the sensor 60 on the destination 120 using a wireless network 76, for example, wireless communication paths via IR wireless communication, radio frequency transmission, Bluetooth, Wi-Fi, ultra wideband (UWB), etc. That is, the destination 120 may be equipped with devices including the sensor 60 that enable the communication between the interactive way-finder device 100 and the sensor 60 on the destination 120. For example, the sensor 60 on the destination 120 may include destination communications circuitry 148, such as a transmitter and a receiver.

As provided herein, the device communications circuitry 123 of the interactive way-finder device 100 may communicate with the destination communications circuitry 148 by sending a signal that is received by the sensor 60 of the destination 120. The destination communications circuitry 148 of the sensor 60 may communicate proximity information back to the device communications circuitry 123 of the interactive way-finder device 100 via the destination communications circuitry 148 of the sensor 60. The proximity information may include information regarding the distance from and orientation of the sensor 60 in relation to the location of the interactive way-finder device 100. The controller 118 of the interactive way-finder device 100 receives the proximity information and may trigger activity based on the received proximity information, including updating the positions of the hands 106, 108, 110, altering the appearance of the face 104, or activating onboard effects 128 of the interactive way-finder device 100. Updating the positions of the hands 106, 108, 110 may be accomplished based on the communication between the device communications circuitry 123 of the interactive way-finder device 100 and the destination communications circuitry 148 of the sensor 60 on the destination 120 in conjunction with input from the IMU sensor 93, as discussed above.

Figure 4A:
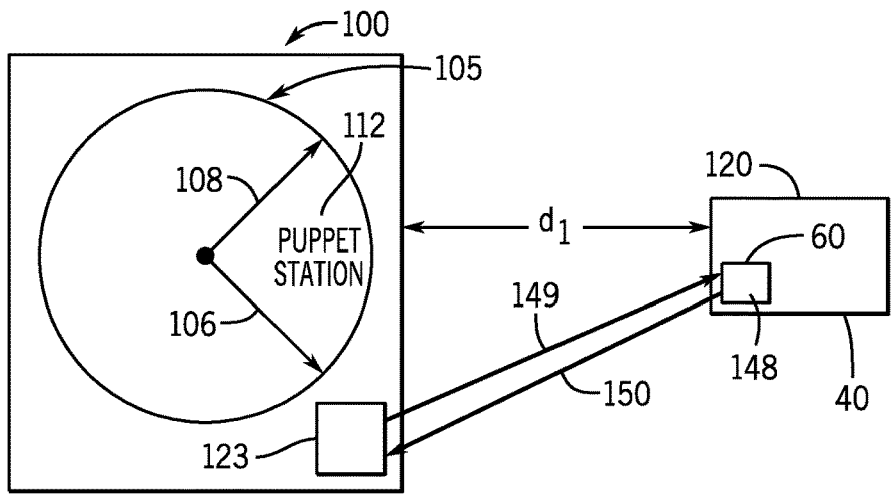
FIG. 4A is a schematic illustration of an interactive way-finder device of an interactive way-finder system operating in a "hot-and-cold" mode, where the interactive way-finder device is at a distance, d1, from an interactive station, in accordance with present embodiments.
Figure 4B:
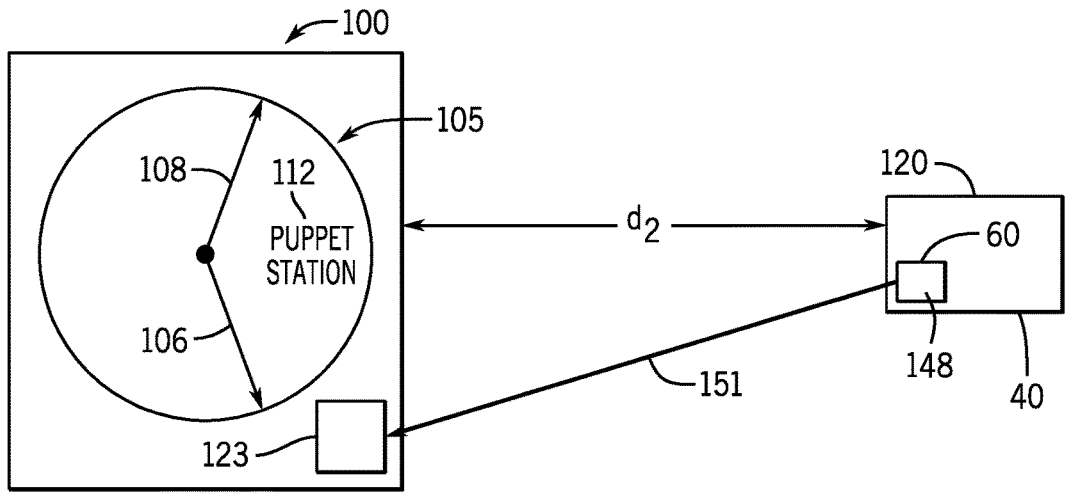
FIG. 4B is a schematic illustration of an interactive way-finder device of an interactive way-finder system operating in a "hot-and-cold" mode, where the interactive way-finder device is at a distance, d2, from the interactive station, in accordance with present embodiments.
Figure 4C:
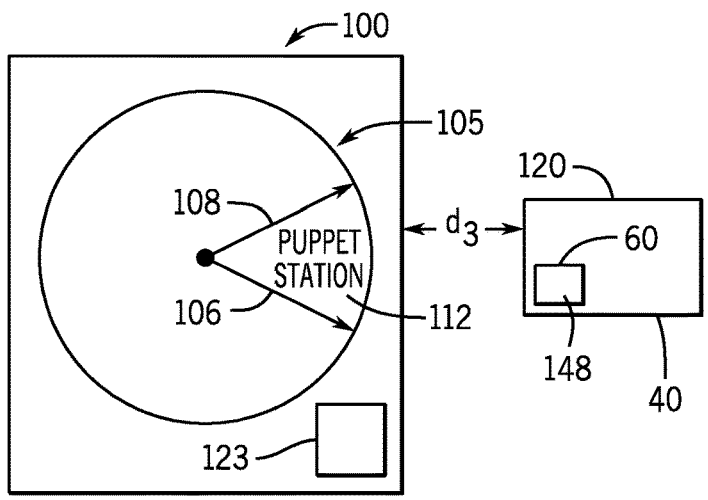
FIG. 4C is a schematic illustration of an interactive way-finder device of an interactive way-finder system operating in "hot-and-cold" mode, where the interactive way-finder device is at a distance, d3, from the interactive station, in accordance with present embodiments.

FIGS. 4A, 4B, and 4C are each schematic illustrations of an embodiment of an interactive way-finder device 100 in a specific mode, which may be described as "hot-and-cold." As used herein, the term "hot-and-cold" is not intended to reflect actual temperatures but instead is used in the context of a game where as a person gets closer to a desired destination, they are deemed to be getting "hotter" and as a person gets farther away from a desired destination, they are deemed to be getting "colder." As illustrated in FIG. 4A, the display 105 of the interactive way-finder device 100 includes a face 104 and has a displayed destination 112 representative of an interactive station 40 such as "puppet station." The ends of the hands 106 and 108 on the face 104 are on either side of the displayed destination 112 on the face 104. In the example illustrated in FIGS. 4A, 4B, and 4C, the destination 120 is the puppet station 40 and includes sensor 60. In the embodiment illustrated in FIG. 4A, the sensor 60 receives a signal 149 from the device communications circuitry 123 on the interactive way-finder device 100. The destination communications circuitry 148 within the sensor 60 responds with a signal 150 that is received by the device communications circuitry 123 on the interactive way-finder device 100. In the embodiment illustrated in FIG. 4B, the sensor 60 on the destination 120 may be an emitter that emits a signal 151 (for example, a signal that is not in response to receiving a signal from the interactive way-finder device 100) that is received by the device communications circuitry 123 in the interactive way-finder device 100, which results in the interactive way-finder device 100 to adjust the position of one or more of the hands 106, 108, 110, as described below.

As illustrated in FIGS. 4A, 4B, and 4C, the position of the hands 106 and 108 move depending on whether the interactive way-finder device 100 is getting closer to the puppet station 40 or farther away from the puppet station 40. Generally, as the interactive way-finder device 100 gets closer to the puppet station 40 (as determined through the wireless interaction of the destination communications circuitry 148 on the sensor 60 of the puppet station 40 and the device communications circuitry 123 of the interactive way-finder device 100), the hands 106 and 108 get closer together in the radial direction, one on each side of the displayed destination 112, illustrated in FIGS. 4A, 4B, and 4C as "puppet station". That is, the ends of the hands 106 and 108 get closer together as the guest holding the interactive way-finder device 100 is getting "hotter". As the interactive way-finder device 100 gets farther away from the puppet station 40 (as determined through the wireless interaction of the destination communications circuitry 148 on the sensor 60 of the puppet station 40 and the device communications circuitry 123 of the interactive way-finder device 100), the hands 106 and 108 get farther apart in the radial direction. That is the ends of the hands 106 and 108 get farther apart as the guest holding the interactive way-finder device 100 is getting "colder". For example, in FIG. 4A, the interactive way-finder device 100 is at a distance, d1, from the puppet station 40. As shown in FIG. 4A, ends of the hands on the interactive way-finder device 100 are on either side of the displayed destination 112 "puppet station" on the face 104. As shown in FIG. 4B, the interactive way-finder device 100 is at a distance, d2, from the puppet station 40. The distance d2 is larger than the distance d1 in FIG. 4A. As a result, the ends of the hands 106 and 108 are farther apart on the face 104 of the interactive way-finder device 100 in FIG. 4B than in FIG. 4A. As shown in FIG. 4C, the interactive way-finder device 100 is at a distance, d3, from the puppet station 40. The distance d3 is smaller than d1 or d2. As shown in FIG. 4C, the ends of the hands on the interactive way-finder device 100 are converging on the displayed destination 112 of "puppet station" on the face 104.

When operating in "hot-and-cold" mode, the display 105, or a portion of the display 105 such as the face 104, may change colors. For example, coloring of the display 105 (e.g., imagery or a background of the display 105) may shift to a reddish hue, as the interactive way-finder device 100 gets closer to the destination 120 and is thus getting "hotter." When the interactive way-finder device 100 gets farther away from the destination 120, the display 105, or a portion of the display 105, such as the face 104, may shift to a greenish or bluish hue to signal to the guest that they are getting "colder." In an embodiment, the colors of hands 106 and 108 may also change depending on whether the interactive way-finder device 100 is getting closer to the destination 120 or farther away from the destination 120.

In an embodiment, the interactive way-finder device 100 may operate in this "hot-and-cold" mode with the positions of the hands 106 and 108 moving with respect to the distance between the interactive way-finder device 100 and the destination 120. The destination 120 in such an embodiment may be selected by the interactive way-finder device 100 based on the location of the interactive way-finder device 100 in the amusement park 10. It should be understood that the position of the displayed destination 112 of "puppet station" on the display 105 may change based on the orientation of the interactive way-finder device 100. For example, if the interactive way-finder device is turned, the position of the displayed destination 112 on the display 105 will move relative to the way-finder device to reflect the appropriate position and direction of the puppet station 40.

Figure 5A:
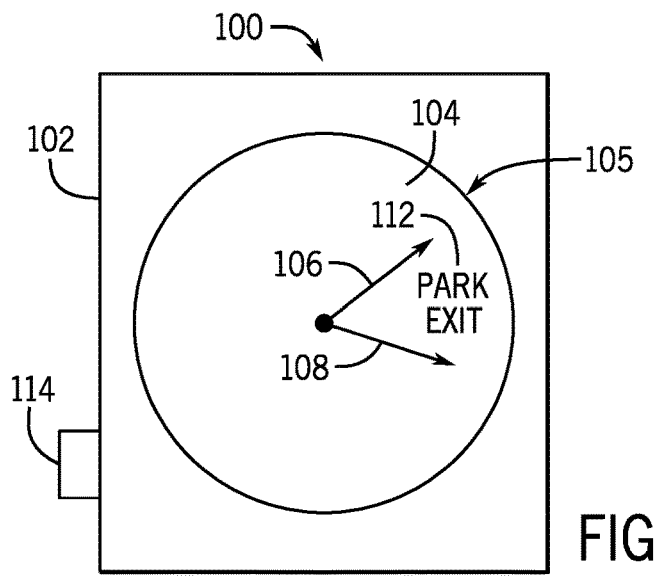
FIG. 5A is a schematic illustration of an interactive way-finder device of an interactive way-finder system operating in "hot-and-cold" mode, where the interactive way-finder device is pointing to a destination "park exit" based on the location of the interactive way-finder device, in accordance with present embodiments.
Figure 5B:
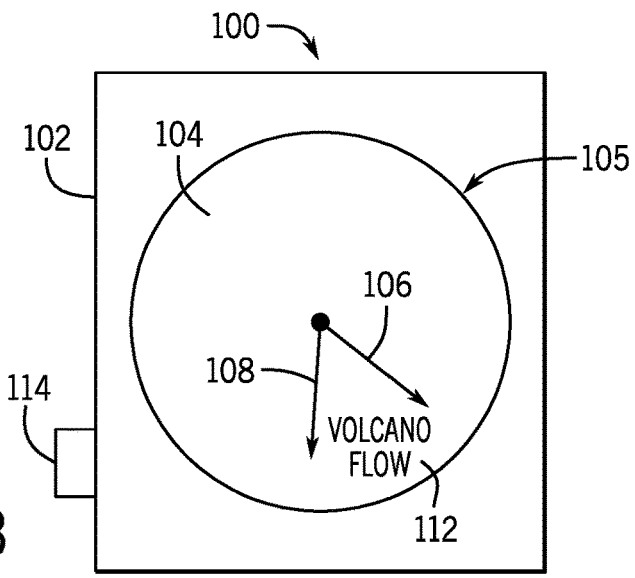
FIG. 5B is a schematic illustration of an interactive way-finder device of an interactive way-finder system operating in "hot-and-cold" mode, where the interactive way-finder device is pointing to a destination "Volcano Flow" based on the location of the interactive way-finder device, for example based on the location of the interactive way-finder device in the amusement park, in accordance with present embodiments.
Figure 5C:
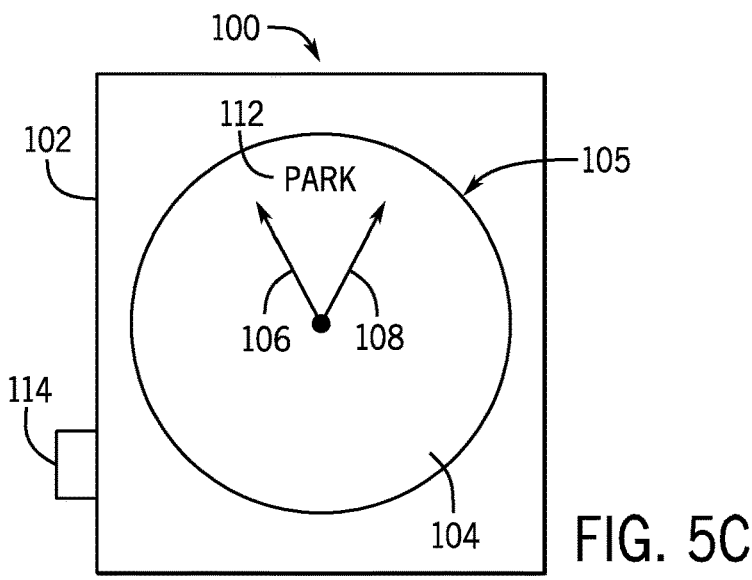
FIG. 5C is a schematic illustration of an interactive way-finder device of an interactive way-finder system operating in "hot-and-cold" mode, where the interactive way-finder device is pointing to a destination "Park" based on the location of the interactive way-finder device, for example, based on the location of the interactive way-finder device outside the amusement park, in accordance with present embodiments.

FIGS. 5A, 5B, and 5C are each schematic illustrations of an interactive way-finder device of an interactive way-finder system operating in "hot-and-cold" mode, in which the interactive way-finder device is pointing to different destinations 120 as selected by the interactive way-finder device 100. The mode in which the interactive way-finder device 100 selects the destination 120 is referred to herein as "automatic mode." For example, if the interactive way-finder device 100 is within a certain distance from the exit of the amusement park, when in "automatic mode," the interactive way-finder device 100, specifically the controller 118 within the interactive way-finder device 100, automatically selects the destination 120 as, for example, the park exit 80, and causes the display 105 to present the displayed destination 112 on the face 104 of the interactive way-finder device 100. The displayed destination 112 may be the park exit 80, as shown in FIG. 5A. As another example, if the interactive way-finder device 100 is within a certain distance from a premier attraction, when in "automatic mode," the interactive way-finder device 100, specifically the controller 118 within the interactive way-finder device, automatically selects the destination 120 as the premiere attraction and causes the display 105 to present the displayed destination 112 as the selected destination 120 (e.g., present the title of the attraction, such as Volcano Flow, on display 105), as shown in FIG. 5B. As another example, when in "automatic mode," if the interactive way-finder device 100 is outside of the amusement park, the interactive way-finder device 100, specifically the controller 118 within the interactive way-finder device 100, automatically selects the destination 120 as, for example, the amusement park itself (e.g., the amusement park entrance) and causes the display 105 to present the displayed destination 112 as the amusement park, as shown in FIG. 5C.

The logic for assessing the selection of the destination 120 based on the location of the interactive way-finder device 100 in the amusement park 10 may be resident on the controller 118 or may be resident on a central controller 70 in wireless communication with the interactive way-finder device 100.

In "automatic mode," in addition to the location of the interactive way-finder device 100, the logic for assessing the selection of the destination 120 may also take into account the history of the guest as informed by a user profile, associated with a guest or user and associated with user information. User information stored in the user or guest profile may include information such as how many times the guest has been at a particular destination 120 before, how many time the guest has been to the amusement park 10 before, and the like. The interactive way-finder device 100 may have access to the user profile, and the user profile may inform the selection of the destination 120 by the interactive way-finder device 100 when in "automatic mode." For example, if a guest has already experienced a premier ride on a particular day or within a particular number of days, the logic for assessing selection of the destination 120 may select the next-closest or next-most-popular premier ride as the destination 120. In addition, the guest may provide a list of preferred premier rides that the logic may use as a selection list.

In another embodiment, the guest 16 may select the type of destination 120 via the mode switch 114. The mode in which the guest 16 selects the destination 120 based on the guest's preferences is referred to herein as "guest selection mode." For example, a guest may select "interactive station" using the mode switch 114, in which case the destination 120 is the interactive station, for example a gesture interactive station such as a puppet station 40, closest to the interactive way-finder device 100, and the displayed destination 112 on the face 104 of the interactive way-finder device 100 is the puppet station. As another example, a guest may select "rides" using the mode switch 114, in which case the destination 120 is the nearest ride to the interactive way-finder device 100 and the displayed destination 112 on the display 105 of the interactive way-finder device 100 is the nearest ride. As another example, a guest may select "all" using the mode switch 114, in which case the destination 120 is the nearest destination 120 having a sensor 60—whether it be a gesture interactive station, a premier attraction, or the park exit, for example—to the interactive way-finder device 100. The displayed destination 112 on the display 105 of the interactive way-finder device 100 updates accordingly. The display 105, or portions of the display 105 such as the face 104, may change colors or otherwise change appearance depending on the mode in which the interactive way-finder device 100 is operating. The logic for enabling the guest 16 to select the destination 120 may be resident on the controller 118 or may be resident on a central controller 70 in wireless communication with the interactive way-finder device 100.

In another embodiment, the guest 16 may choose for the interactive way-finder device 100 to operate in a "game mode," in which the destination 120 is related to a game, for example a treasure hunt, a scavenger hunt, a quest, a monster hunt, or other game related to finding certain destinations. In "game mode," the display 105, the face 104, and/or the hands 106, 108, 110 of the interactive way-finder device 100 may change in appearance to match the theme of the game. For example, if the guest selects "treasure hunt", the display 105 and the face 104 may appear as a treasure map and the hands 106, 108, and 110 may appear in an old-fashioned style. As another example, if the guest 16 selects "monster hunt," the display 105 and the face 104 may appear as a monster and the hands 106, 108, and 110 may appear as stylized arrows.

Figure 6A:
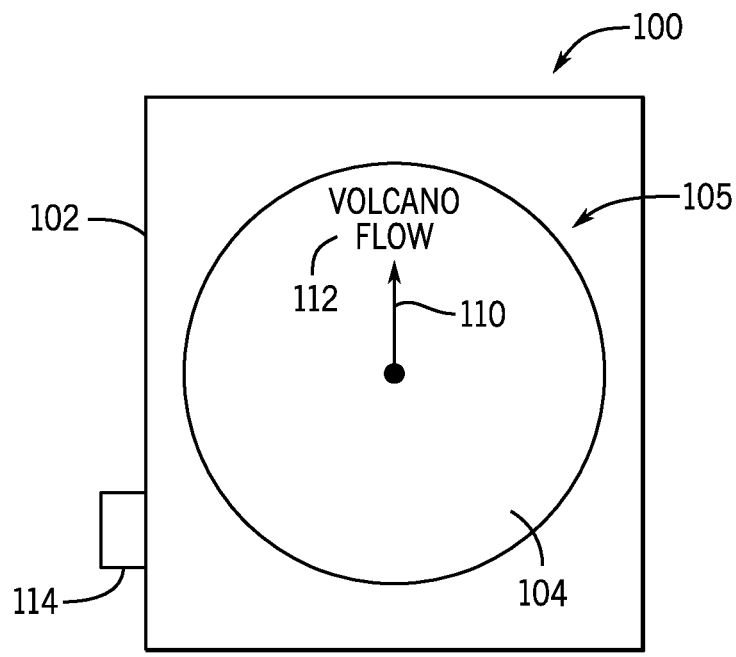
FIG. 6A is a schematic illustration of an interactive way-finder device of an interactive way-finder system operating in "classic compass" mode, where the destination is "Volcano Flow," in accordance with present embodiments.
Figure 6B:
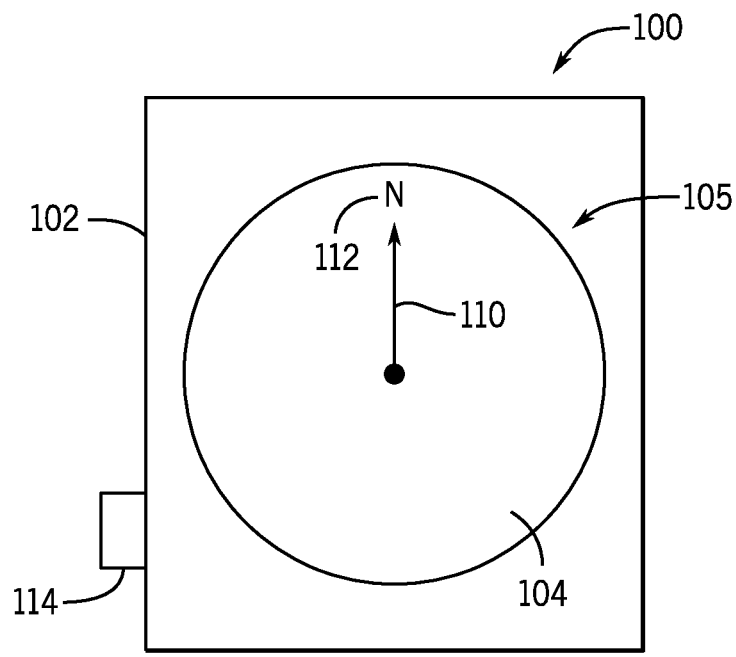
FIG. 6B is a schematic illustration of an interactive way-finder device of an interactive way-finder system operating in "classic compass" mode, where the destination is "magnetic north," in accordance with present embodiments.

FIGS. 6A and 6B are each schematic illustrations of an interactive way-finder device of an interactive way-finder system operating in "classic compass" mode, in which the hand 110 points in the direction to the destination 120, as illustrated in FIGS. 6A and 6B. The destination 120 may be a specific attraction, for example a premier attraction, as shown in FIG. 6A. In the alternative, the destination 120 may be magnetic north, as in a typical compass, as shown in FIG. 6B. In the alternative, the destination 120 may be any of those described with respect to "hot-and-cold" mode. Destinations 120 in "classic compass" mode may be chosen automatically by the interactive way-finder device 100, as in "automatic mode" as described above, or may be chosen by the guest 16, as described above in "guest-selection" mode.

In an embodiment, the interactive way-finder device 100 may operate in "hot-and-cold" mode and "classic compass" mode at the same time, and thus use the hand 110 as a "classic compass" and the hands 106 and 108 as "hot-and-cold" indicators, as shown, for example, in FIG. 4. For example, the interactive way-finder device 100 may operate in "classic compass" mode in which the hand 110 points directly to the displayed destination 112, where displayed destination 112 corresponds to a destination 120—while the interactive way-finder device 100 also operates in "hot-and-cold" mode in which the hands 106 and 108 are on either side of the displayed destination 112 and get closer together the as the interactive way-finder device 100 gets closer to the destination 120.

The various modes in which the interactive way-finder device 100 may operate may be summarized as follows, with the understanding that there may be additional modes or sub-modes that fall within the scope of the present disclosure. It is to be understood that the interactive way-finder device 100 may operate in one or more of the below modes or sub-modes at any given time.

In "hot-and-cold" mode, the destinations 120 may be selected automatically by the interactive way-finder device 100 ("automatic mode") or may be selected by the guest ("guest selection mode"). In addition, the destinations 120 may be selected from a wide variety of categories including but not limited to an attraction (for example, the closest ride, the most popular attraction within a proximity, the closest interactive feature, which may include an interactive feature 42 that interacts with the interactive way-finder device 100 and/or another device, such as a wristband or other object), a game (for example, in which the destination 120 is associated with a game such as a treasure hunt), amenities (for example, the nearest restaurant 50, restroom facilities 56, park exit 80, and the like), or all destinations (for example, multiple destinations, each with a corresponding displayed destination 112 on the face 104, with designated hands indicating the direction of a particular destination 120).

Similarly, in "classic compass" mode, the destinations 120 may be selected automatically by the interactive way-finder device 100 ("automatic mode") or may be selected by the guest ("guest selection mode"). In addition, the destinations 120 may be selected from a wide variety of categories including but not limited to magnetic north, an attraction (for example, the closest ride, the most popular attraction within a proximity, the closest interactive feature 40, which may include an interactive feature that interacts with the interactive way-finder device 100 and/or another device, such as a wristband or other object), a game (for example, in which the destination 120 is associated with a game such as a treasure hunt), amenities (for example, the nearest restaurant 50, restroom facilities 56, park exit 80, and the like), or all destinations (for example, multiple destinations, each with a corresponding displayed destination 112 on the face 104, with designated hands indicating the direction of a particular destination 120).

Figure 7:
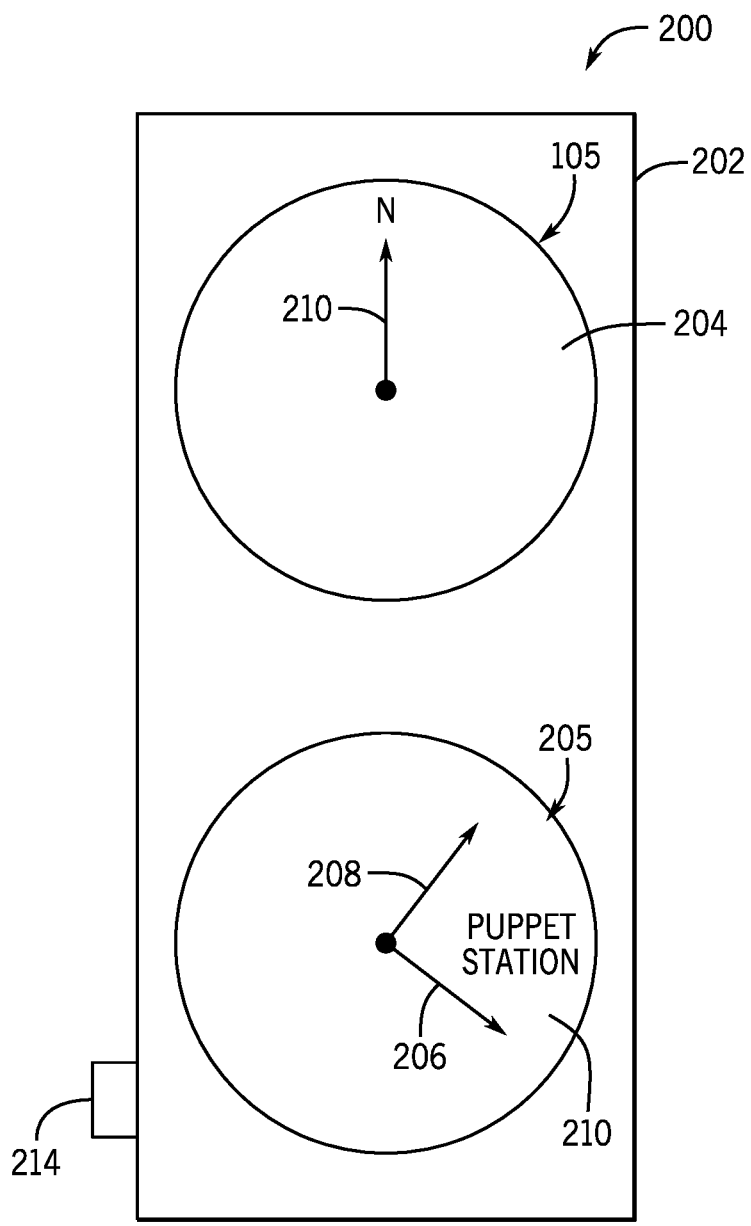
FIG. 7 is a schematic illustration of an interactive way-finder device of an interactive way-finder system, in accordance with present embodiments.

FIG. 7 is a schematic illustration of another embodiment of the present disclosure wherein an interactive way-finder device 200 may have more than one face in the housing 202. While the embodiment illustrated in FIG. 7 has two faces, 204 and 205, it is to be understand that an embodiment could have more than two faces. Multiple faces in the same housing 202 would allow the interactive way-finder device 200 to operate in a separate mode on each respective face, while each face is displayed to the guest. For example, face 204 may operate in "classic compass" mode with hand 210 pointing to "north," while face 205 operates in "hot-and-cold" mode with hands 206 and 208 to direct the guest toward a destination 120 such as a puppet station 40. Additional faces in the housing 202 could operate, for example, in "hot-and-cold" mode to direct the guest toward a destination 120 such as premier attraction 54 or to the park exit 80. Switching among modes may be accomplished by using a mode switch, 214.

The communication may include wireless communication protocols, for example UWB, IR, radio frequency transmission, that enable communication between electronic devices over a distance, such as between 4 meters (m) and 20 m. The communication may be indicative of the interactive way-finder device 100 being within a certain proximity of the sensor 60 on the destination 120. The communication may result in the interactive way-finder device adjusting the position of one or more of the hands 106, 108, 110 on the interactive way-finder device 100, as described above. As described above, in another embodiment, the sensor 60 on the destination 120 may be an emitter that emits a signal received by the device communications circuitry 123 in the interactive way-finder device 100, which results in the interactive way-finder device 100 to adjust the position of one or more of the hands 106, 108, 110.

Figure 8:
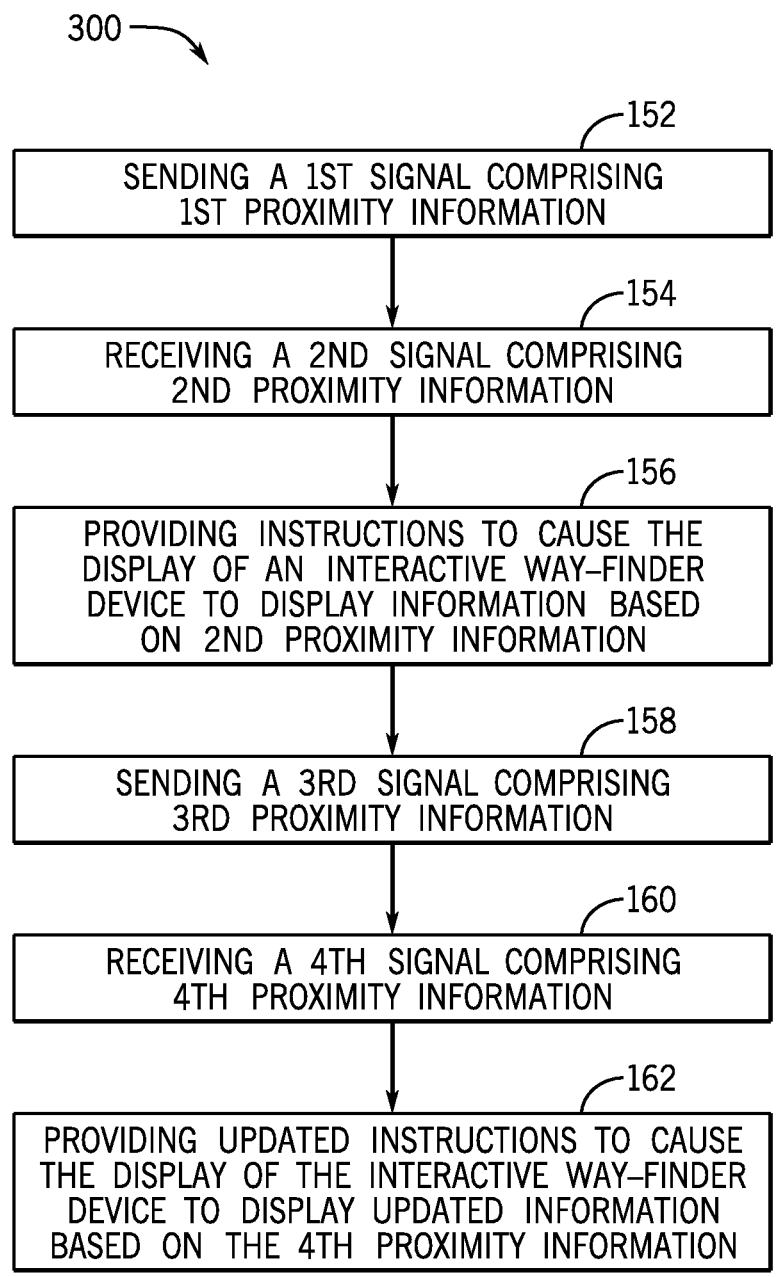
FIG. 8 is a flow diagram illustrating a method of way-finding using an interactive way-finder device, in accordance with present embodiments.

FIG. 8 is a flow diagram illustrating one embodiment of a process 300 for operating the interactive way-finder device 100, in accordance with present techniques. It is to be understood that the steps discussed herein are merely exemplary, and certain steps may be omitted or added, and the steps may be performed in a different order. In one embodiment, the steps of the process 300 may be executed by the interactive way-finder device 100 and other components of the system 12, such as a destination 120 having destination communications circuitry 148.

The process 300 includes a step of sending a signal via wireless communications circuitry comprising first proximity information (block 152). The signal may be sent by the device communications circuitry 123 of the interactive way-finder device 100 and may include proximity information indicative of the location of the interactive way-finder device 100. This signal is received by the destination communications circuitry 148 on a sensor 60 on a destination 120, which sends a signal in response. The process 300 also includes a step of receiving a second signal (i.e., the response signal) that comprises second proximity information (block 154). The second proximity information is indicative of the relative location of the destination communications circuitry 148 on the sensor 60 on the destination 120 compared to the location of the device communications circuitry 123 of the interactive way-finder device 100. The process 300 also includes the step of providing instructions to cause the display 105 of the interactive way-finder device 100 to display information based on the second proximity information (block 156). Displaying information based on the second proximity information may include, for example, moving the hands 106 and 108 on the display 105 on either side of the displayed destination 112, which corresponds with the destination 120, when the interactive way-finder device 100 is in "hot-and-cold" mode. When in "classic compass" mode, displaying information based on the second proximity information may include, for example, moving the hand 110 to point directly at the displayed destination 112, which corresponds with the destination 120. The interactive way-finder device 100 then sends a third signal via wireless communications circuitry comprising third proximity information (block 158). This third signal is received by destination communications circuitry 148 of the sensor 60 on the destination 120, which sends a fourth signal in response. This fourth signal comprises fourth proximity information and is received by the device communications circuitry 123 on the interactive way-finder device 100 (block 160). Updated instructions are provided to cause the display 105 of the interactive way-finder device 100 to display updated information based on the fourth proximity information (block 162). As explained above, displaying information based on the fourth proximity information may include, for example, moving the hands 106 and 108 on the display 105 on either side of the displayed destination 112, which corresponds with the destination 120, when the interactive way-finder device 100 is in "hot-and-cold" mode. When in "classic compass" mode, displaying information based on the second proximity information may include, for example, moving the hand 110 to point directly at the displayed destination 112, which corresponds with the destination 120. In this way, the display 105 is updated as the location of the interactive way-finder device 100 changes relative to the location of the destination 120 (and more specifically, the location of the destination communications circuitry 148 of the sensor 60 on the destination 120).

The mode in which the interactive way-finder device 100 operates may be switched by the guest 16. For example, the interactive way-finder device 100 may start up in "automatic" mode where destinations 120 are selected based on location of interactive way-finder device 100 in the amusement park 10 or informed by the guest's user profile, as described above. When the interactive way-finder device 100 is in a particular region of the amusement park 10, the displayed destinations 112 may be a premier attraction in that region, an interactive feature 40 in that region, and a restaurant 50 in that region. If the guest 16 is more interested in a specific category of destinations, however, the guest 16 may switch to "guest selection" mode, using the mode switch 114, and the destinations 120 may be selected by the guest 16, for example based on a category of destinations, like all the restaurants in the amusement park, or all the premier attractions in the amusement park. This mode switching is accomplished using the mode switch 114 on the interactive way-finder device 100.

The interactive way-finder system 12 may be employed to add a layer of entertainment to other entertainment features. In another embodiment, the communication between the device communications circuitry 123 of the interactive way-finder device 100 and the destination communications circuitry 148 of the sensor 60 on the destination 120 may result in a reaction at the destination 120 including special effects, such as producing bubbles, water sprays, and/or confetti. In another embodiment, the communication may result in a reaction of the interactive way-finder device 100, for example activating onboard effects of the interactive way-finder device 100. In another embodiment, the communication may result in a reaction of both special effects at the destination 120 and a reaction of the interactive way-finder device 100.

Figure 9:
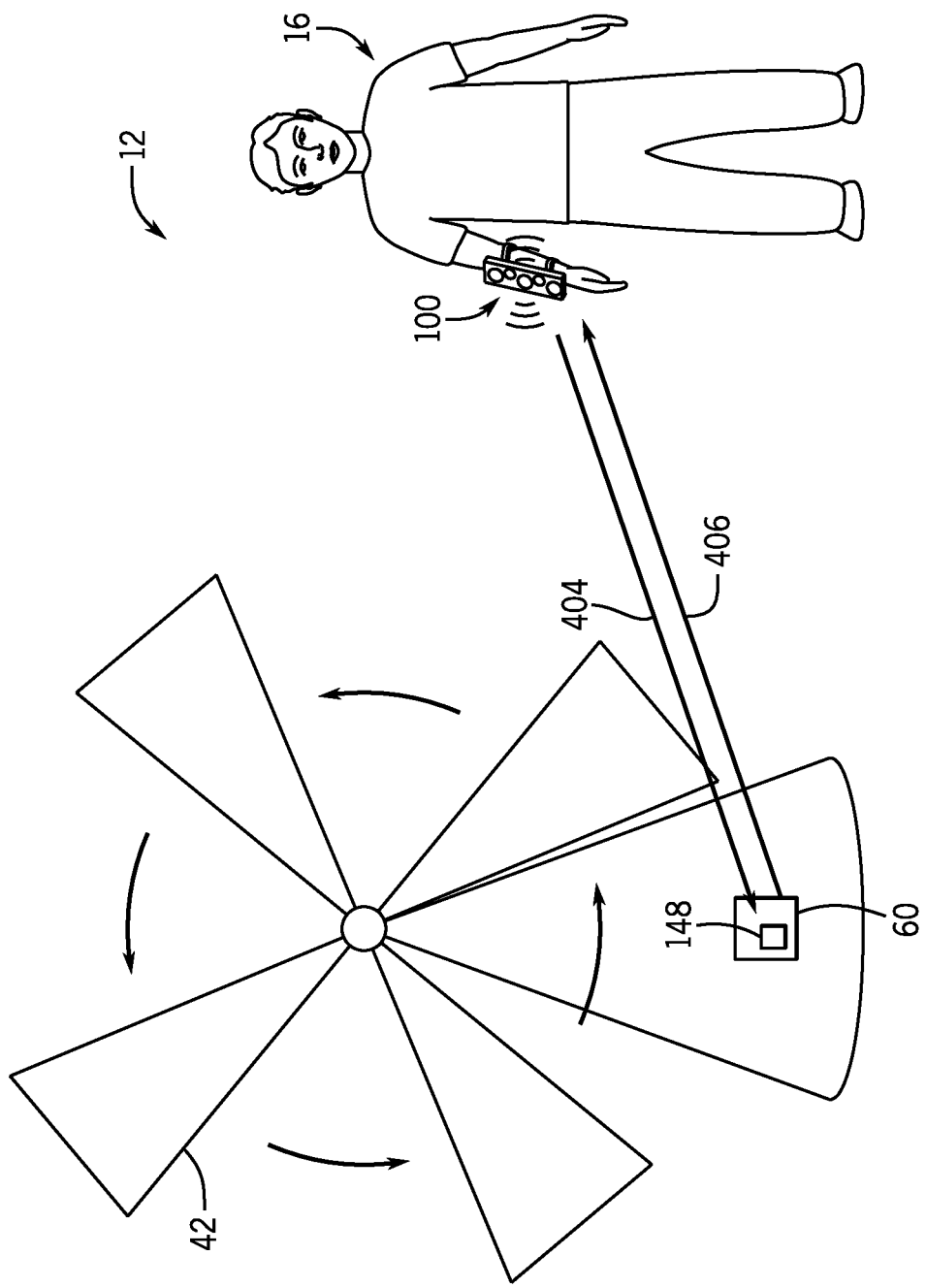
FIG. 9 is a schematic illustration of an interactive way-finder device in an interactive way-finder system, in accordance with present embodiments.

For example, as illustrated in FIG. 9, the system 12 may be employed in conjunction with interactive features in the amusement park to add to guest enjoyment and immersion in the environment. Specifically, FIG. 9 illustrates a guest 16 in a portion of the amusement park utilizing the system 12 to actuate activation of an interactive feature 42, illustrated as a windmill, integrated in the environment. In this example, the device communications circuitry 123 of the interactive way-finder device 100 transmits a signal 406 from the interactive way-finder device 100. The signal 406 is received by the destination communications circuitry 148 of the sensor 60, and circuitry within sensor 60 causes a reaction in the interactive feature 42 that is observable by the guest 16, for example, the blades of the windmill to spin rapidly. The destination communications circuitry 148 within sensor 60 may also produce a response signal 406 that is received by the device communications circuitry 123 in the interactive way-finder device 100, which causes the controller 118 to activate the onboard effects 128 of the interactive way-finder device 100. It should be understood that the reaction triggered by the proximity of the interactive way-finder device 100 and the destination 120 may be one-way (i.e., only one of the interactive way-finder device 100 or the destination 120 has a reaction) or two-way (i.e., both the interactive way-finder device 100 and the destination 120 have a reaction). As described above, the sensor 60 on the destination 120 may be an emitter that emits a signal (for example, a signal that is not in response to receiving a signal from the interactive way-finder device 100) that is received by the device communications circuitry 123 in the interactive way-finder device 100, which causes the controller 118 to activate onboard effects 128 of the interactive way-finder device 100.

As described above, the interactive way-finder device 100 may be associated with a guest or user profile associated with user information. User information stored in the guest profile may include information such as how many times the guest 16 has been at a particular destination 120 before, how many time the guest 16 has been to the amusement park 10 before, and the like. The reaction in the destination 120 may vary depending on the user information in the guest profile of the interactive way-finder device 100. For example, if the user information in the guest profile indicates that the guest 16 has not been to this destination 120 ever, or for a long time, the reaction of the destination 120 may be more dramatic (e.g., windmill blades spin more rapidly) than if the guest profile indicates that the guest has been to the destination 120 recently. Alternatively, the reaction of the destination 120 may increase the more times the guest 16 has been within a certain proximity of the destination 120, creating a crescendo in the reaction of the destination 120. While the reaction has been discussed as being the blades of a windmill spinning, it should be understood that other reactions are included within the scope of the present disclosure, such as a water squirt, a fire blast, a sound or song, flashing lights, different colored lights, and the like.

In addition to impacting the reactions of the destinations 120 as described above, the user information in the guest profile may also be used to help select the destination 120. For example, if a guest 16 has a favorite premier ride, based on the user information counting the number of times that the guest 16 has visited such ride as informed by the guest profile, the interactive way-finder device 100 may display the title of the premier ride as the displayed destination 112 on the face 104 of the interactive way-finder device 100 when the guest 16 enters the amusement park 10.

In another embodiment, the interactive way-finder device 100 may react to inputs received (e.g., inputs received via data-over-sound). As used herein, data-over-sound technology means that ultrasound is used to transfer data between two devices by using a transmitter (e.g., a speaker) and an input source (e.g., a microphone). For data-over-sound technology, the data is encoded into an acoustic signal that is played into a space (for example, air, VoIP stream, wired telephone lines) and then received and demodulated by a listening device. Data is subsequently decoded by the listening device, or group of devices, and provides the original data to the listening device.

For example, the device communications circuitry 123 in the interactive way-finder device 100 may receive an ultrasound signal from an ultrasound transmitter, or speaker, inside the amusement park. The device communications circuitry 123 in the interactive way-finder device 100 may interact with the controller 118, which may then activate onboard effects 128 of the interactive way-finder device 100. The ultrasound signals may be generated in the amusement park, for example, and be encoded in certain songs, audio announcements, or other audio signals. In addition, the ultrasound signals may be received when the interactive way-finder device 100 is outside of the amusement park through broadcast music or announcements sponsored or otherwise affiliated with the amusement park. For example, the interactive way-finder device 100 may react while at a guest's home when an advertisement for the amusement park is broadcast within the guest's home. In this example, the device communications circuitry 123 of the interactive way-finder device 100 would receive the ultrasound signal embedded in the acoustic signal of the broadcast advertisement of the amusement park and the controller 118 may activate onboard effects 128 of the interactive way-finder device 100, as described above.

While only certain features of the invention have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An interactive way-finder system, comprising:
 a destination comprising an emitter; and
 an interactive way-finder device comprising:
  a housing;
  device communications circuitry disposed within the housing, the device communications circuitry configured to receive proximity information from the emitter, the proximity information comprising:
   an orientation of the interactive way-finder device relative to the emitter; and
   a distance between the interactive way-finder device and the emitter;
  a display coupled to the housing and comprising:
   a first hand and a second hand; and
   a displayed destination representative of the destination, wherein the interactive way-finder device is configured to change a position of the displayed destination on the display based on the proximity information from the emitter; and
  a processor configured to modify the display to change a distance between the first hand and the second hand based on the proximity information from the emitter, wherein the distance between the first hand and the second hand is representative of the distance between the interactive way-finder device and the emitter.

2. The interactive way-finder system of claim 1, wherein the interactive way-finder device comprises an inertial measurement unit sensor and the processor is configured to cause the at least one of the first hand or the second hand to point in a direction of the destination based on information from the inertial measurement unit sensor.

3. The interactive way-finder system of claim 1, wherein the displayed destination comprises a textual descriptor of the destination.

4. The interactive way-finder system of claim 1, wherein the display is configured to change based on changes in the proximity information by moving the first hand and the second hand closer together in a radial direction in response to the proximity information indicating the interactive way-finder device is travelling in the direction of the destination and by moving the first hand and the second hand apart in the radial direction in response to the proximity information indicating the interactive way-finder is travelling in a direction different than that of the destination.

5. The interactive way-finder system of claim 4, wherein the first hand and the second hand are physical objects and are moved by a motor contained within the interactive way-finder device.

6. The interactive way-finder system of claim 1, wherein the interactive way-finder device comprises onboard effects that are controlled by the processor and wherein the device communications circuitry is configured to activate one or more of the onboard effects based on communication with the emitter.

7. The interactive way-finder system of claim 1, wherein the interactive way-finder device is associated with a user profile, and wherein user information is stored in the user profile and a central controller is configured to communicate the user information to memory in the interactive way-finder device via the device communications circuitry.

8. The interactive way-finder system of claim 7, wherein the user profile informs a selection of a displayed destination by the processor or a selection of one or more onboard effects by the processor.

9. The interactive way-finder system of claim 1, wherein the processor is configured to select the destination from a plurality of destinations based on a relative location of the interactive way-finder system related to a nearest attraction or a nearest amenity.

10. The interactive way-finder system of claim 1, wherein the destination comprises a sensor that comprises destination communications circuitry and the device communications circuitry is configured to communicate with the destination communications circuitry to cause a reaction at the destination.

11. The interactive way-finder system of claim 10, wherein the reaction at the destination comprises emitting confetti, water spray, bubbles, or a combination thereof.

12. The interactive way-finder system of claim 10, wherein the interactive way-finder device is associated with a user profile, wherein user information is stored in the user profile and a central controller is configured to communicate the user profile to memory in the interactive way-finder device via the device communications circuitry, and wherein the reaction at the destination is informed by the user profile.

13. The interactive way-finder system of claim 1, wherein the display of the interactive way-finder device comprises a first face and a second face, wherein the first face has a first displayed destination of magnetic north.

14. An interactive way-finder device, comprising:
a housing;
memory disposed in the housing;
device communications circuitry disposed within the housing, the device communications circuitry configured to:
receive proximity information from an emitter associated with a destination, the proximity information comprising an orientation of the interactive way-finder device relative to the emitter and a first distance between the interactive way-finder device and the emitter; and
store the proximity information in the memory;
a display coupled to the housing and comprising a hand and a displayed destination representative of the destination, wherein the interactive way-finder device is configured to change a position of the displayed destination on the display based on the proximity information;
an inertial measurement unit sensor disposed in the housing;
a processor configured to:
change a position of the hand based on inertial data from the inertial measurement unit sensor;
modify the display to change a second distance between the hand and another hand of the display based at least in part on the proximity information, wherein the second distance is representative of the first distance; and
cause the display to present the displayed destination representative of the destination.

15. The interactive way-finder device of claim 14, wherein the interactive way-finder device comprises one or more onboard effects configured to be activated by the processor based on the proximity information.

16. The interactive way-finder device of claim 14, wherein the displayed destination comprises a textual descriptor for the destination.

17. A method of way finding with an interactive way-finder device, the method comprising:
receiving, via a processor, a first signal from an emitter comprising first proximity information for an attraction via wireless communications circuitry disposed in a housing of the interactive way-finder device, wherein the first proximity information comprises:
a first distance between the interactive way-finder device and the attraction; and
first orientation information indicative of a first orientation of the interactive way-finder device relative to the attraction;
providing, via the processor, instructions to cause a display of the interactive way-finder device to display:
a displayed destination representative of the attraction; and
information related to the attraction based on the first proximity information, wherein the information related to the attraction comprises, at least in part, a space between a first hand and a second hand, wherein the space is representative of the first distance;
receiving, via the processor, a second signal from the emitter comprising second proximity information for the attraction via the wireless communications circuitry, wherein the second proximity information comprises:
a second distance between the interactive way-finder device and the attraction; and
second orientation information indicative of a second orientation of the interactive way-finder device relative to the attraction; and
providing, via the processor, updated instructions to modify the display of the interactive way-finder device to display updated information related to the attraction based on the second proximity information, wherein the updated information related to the attraction comprises, at least in part:
a change in the space between the first hand and the second hand such that the space is representative of the second distance; and
a change in a position of the displayed destination on the display based on the second orientation information.

18. The method of claim 17, comprising:
activating onboard effects of the interactive way-finder device based on the receiving of the first or second signal.

19. The method of claim 17, comprising:
selecting a destination, wherein the destination comprises destination communications circuitry configured to send the second signal comprising the second proximity information via destination communications circuitry.

20. The method of claim 19, wherein selecting a destination is performed in response to receiving user input at the interactive way-finder device.

* * * * *